(12) United States Patent
Furuya et al.

(10) Patent No.: US 9,523,304 B2
(45) Date of Patent: Dec. 20, 2016

(54) EXHAUST PIPE

(71) Applicant: FUTABA INDUSTRIAL CO., LTD., Okazaki-shi, Aichi (JP)

(72) Inventors: Tomohiro Furuya, Okazaki (JP); Toshio Yokota, Okazaki (JP); Katsuhiko Kainuma, Okazaki (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 0 days.

(21) Appl. No.: 14/775,389

(22) PCT Filed: Feb. 5, 2014

(86) PCT No.: PCT/JP2014/052656
§ 371 (c)(1),
(2) Date: Sep. 11, 2015

(87) PCT Pub. No.: WO2014/141778
PCT Pub. Date: Sep. 18, 2014

(65) Prior Publication Data
US 2016/0017787 A1    Jan. 21, 2016

(30) Foreign Application Priority Data
Mar. 11, 2013  (JP) .................................. 2013-048073

(51) Int. Cl.
*F01N 13/18*    (2010.01)
*F01N 1/02*    (2006.01)
(Continued)

(52) U.S. Cl.
CPC .............. *F01N 13/007* (2013.01); *F01N 1/14* (2013.01); *F01N 13/14* (2013.01);
(Continued)

(58) Field of Classification Search
CPC .................... F01N 2470/24; F01N 13/1844
(Continued)

(56) References Cited

U.S. PATENT DOCUMENTS 3,361,227 A * 1/1968 Kaari .................. F01N 1/00
181/265
3,515,242 A * 6/1970 Lyttle .................. F01N 1/02
181/268
(Continued)

FOREIGN PATENT DOCUMENTS

DE    19629368 A1    1/1998
JP    S57144214 U    9/1982
(Continued)

OTHER PUBLICATIONS

English translation of the International Search Report dated Mar. 13, 2004 for corresponding International Patent Application No. PCT/JP2014/052656, filed Feb. 5, 2014.
(Continued)

Primary Examiner — Jeremy Luks
(74) Attorney, Agent, or Firm — David D. Brush; Westman Champlin & Koehler, P.A.

(57) ABSTRACT

An exhaust pipe that forms an exhaust flow channel includes a first flow channel member that forms part of the exhaust flow channel, and a second flow channel member connected in series with the first flow channel member, and forms part of the exhaust flow channel. A downstream-side end of the first flow channel member is inserted into an upstream-side end of the second flow channel member. A communication channel that communicates between an inside and an outside of the exhaust pipe is formed between an outer surface of an insertion part of the first flow channel member and an inner surface of an insertion-receiving part of the second flow
(Continued)

channel member. The insertion-receiving part is arranged to face higher than a horizontal direction.

16 Claims, 15 Drawing Sheets

(51) Int. Cl.
| | |
|---|---|
| *F01N 1/14* | (2006.01) |
| *F01N 13/00* | (2010.01) |
| *F16L 21/02* | (2006.01) |
| *F01N 13/14* | (2010.01) |
| *F01N 3/28* | (2006.01) |

(52) U.S. Cl.
CPC ..... *F01N 13/1805* (2013.01); *F01N 13/1844* (2013.01); *F16L 21/02* (2013.01); *F01N 3/285* (2013.01); *F01N 2260/14* (2013.01); *F01N 2260/16* (2013.01); *F01N 2260/26* (2013.01); *F01N 2310/14* (2013.01); *F01N 2470/00* (2013.01)

(58) Field of Classification Search
USPC .................. 181/244, 248, 249, 250, 251
See application file for complete search history.

(56) References Cited

U.S. PATENT DOCUMENTS

| | | | | |
|---|---|---|---|---|
| 3,651,888 A * | 3/1972 | Andres | ............... | F01N 1/088 181/265 |
| 4,143,739 A * | 3/1979 | Nordlie | ............... | F01N 1/026 181/265 |
| 4,487,289 A * | 12/1984 | Kicinski | ............... | F01N 1/08 181/252 |
| 4,589,515 A * | 5/1986 | Omura | ............... | F01N 13/082 181/227 |
| 4,924,966 A * | 5/1990 | Kanda | ............... | F01N 1/02 181/228 |
| 5,466,900 A * | 11/1995 | Knapp | ............... | B08B 15/002 181/227 |
| 5,633,482 A * | 5/1997 | Erion | ............... | F01N 1/24 181/228 |
| 5,934,959 A * | 8/1999 | Inman, Sr. | ............. | B63H 21/34 181/256 |
| 6,467,570 B1 * | 10/2002 | Herold | ............... | F01N 1/02 181/212 |
| 6,595,318 B2 * | 7/2003 | Ebinger | ............... | F01N 13/20 180/309 |
| 7,743,883 B2 * | 6/2010 | Kondo | ............... | F01N 1/084 181/244 |
| 2004/0104071 A1 | 6/2004 | Wahlstrom et al. | | |
| 2007/0029135 A1 * | 2/2007 | Ermer | ............... | F01N 13/1811 181/269 |
| 2012/0073275 A1 | 3/2012 | Han et al. | | |
| 2012/0273302 A1 | 11/2012 | Takagaki et al. | | |

FOREIGN PATENT DOCUMENTS

| | | |
|---|---|---|
| JP | S6178224 U | 5/1986 |
| JP | H09291816 A | 11/1997 |
| JP | S63166615 U | 10/1998 |
| JP | 2002364330 A | 12/2002 |
| JP | 4159032 B2 | 10/2008 |
| WO | 2011080793 A1 | 7/2011 |

OTHER PUBLICATIONS

Written Opinion dated Mar. 25, 2014 for corresponding International Patent Application No. PCT/JP2014/052656, filed Feb. 5, 2014.
English Translation of the International Preliminary Report on Patentability dated Oct. 1, 2015, for corresponding international application No. PCT/JP2014052656, filed Feb. 5, 2014.
Partial English Translation of Written Opinion of the International Searching Authority dated Oct. 1, 2015, for corresponding international application No. PCT/JP2014052656, filed Feb. 5, 2014.

* cited by examiner

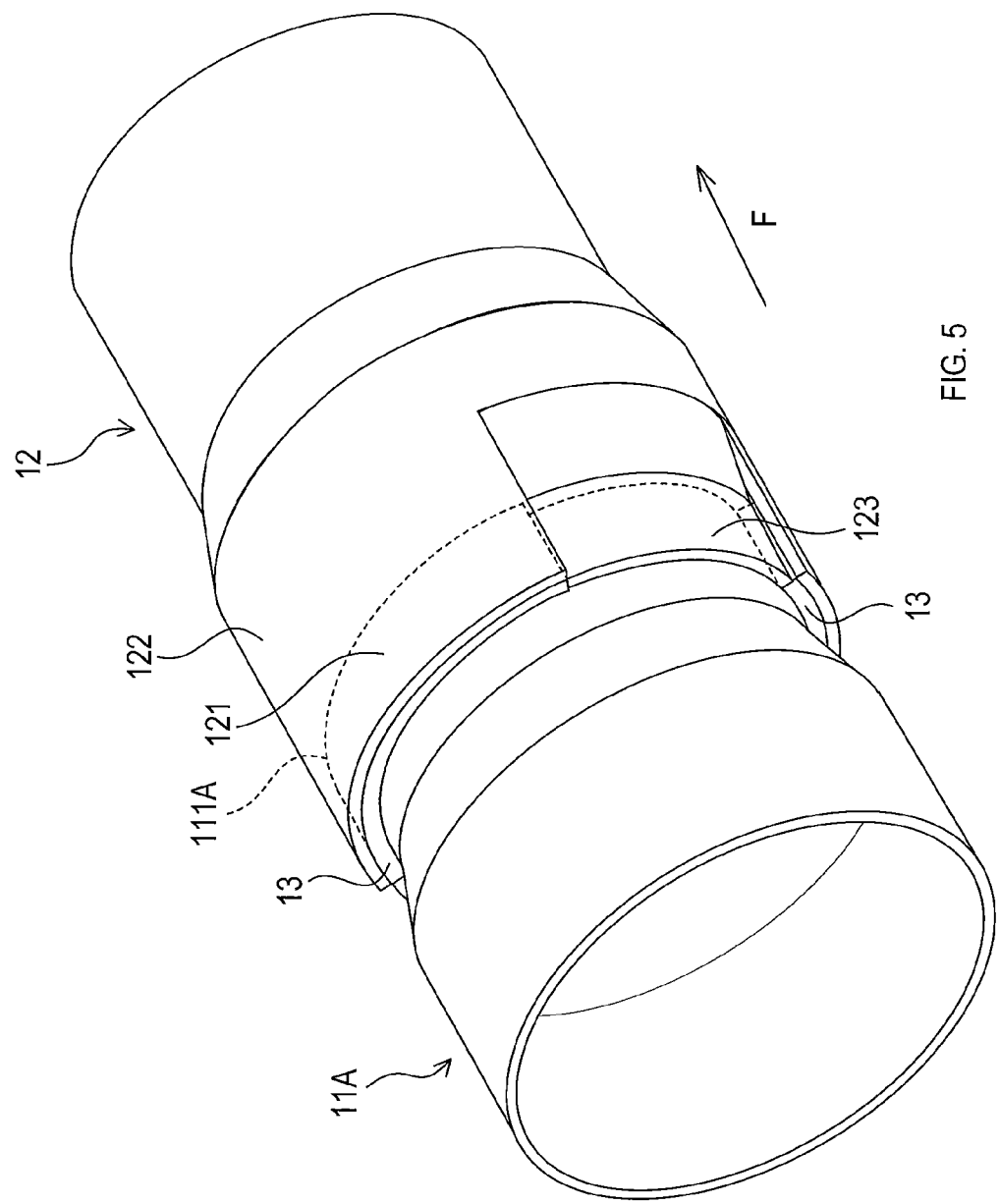

EXHAUST PIPE

CROSS-REFERENCE TO RELATED APPLICATIONS

This Application is a Section 371 National Stage Application of International Application No. PCT/JP2014/052656, filed Feb. 5, 2014, the content of which is incorporated herein by reference in its entirety, and published as WO 2014/141778 on Sep. 18, 2014, not in English, which claims the benefit of Japanese Patent Application No. 2013-48073 filed Mar. 11, 2013 in the Japan Patent Office, and the entire disclosure of Japanese Patent Application No. 2013-48073 is incorporated herein by reference.

TECHNICAL FIELD

The present invention relates to an exhaust pipe that forms an exhaust flow channel.

BACKGROUND ART

In an exhaust system for a motor vehicle, low-frequency air-column resonance sound that occurs in a tail pipe having a relatively long actual length is a factor of worsening exhaust booming noise. Thus, measures have been taken to reduce the air column resonance sound such as by providing a sub-muffler in series with a main muffler.

Patent Document 1 describes a configuration in which a perforation is provided in a position at a distance from an outer end of a conduit for conveying exhaust gas from an internal combustion engine, in order to attenuate resonance in the conduit.

SUMMARY OF THE INVENTION

An exhaust pipe in one aspect of the present invention is an exhaust pipe that forms an exhaust flow channel. The exhaust pipe comprises: a first flow channel member that forms part of the exhaust flow channel; and a second flow channel member that is connected in series with the first flow channel member and forms part of the exhaust flow channel. A downstream-side end of the first flow channel member is inserted into an upstream-side end of the second flow channel member. A communication channel that communicates between an inside and an outside of the exhaust pipe is formed between an outer surface of an insertion part of the first flow channel member and an inner surface of an insertion-receiving part of the second flow channel member. The insertion-receiving part is arranged to face higher than a horizontal direction.

According to the configuration as above, since the communication channel that communicates between the inside and outside of the exhaust pipe is formed, it is possible to depressurize sound pressure in the pipe when air-column resonance sound is generated so as to inhibit standing waves. Moreover, since the insertion-receiving part is arranged to face higher than the horizontal direction, condensed water generated in the exhaust pipe can be less likely to be drained in the middle of the exhaust pipe.

In the above configuration, the exhaust pipe may further comprise a mesh member provided in the communication channel, and the inside and outside of the exhaust pipe may be in communication with each other via the mesh member. According to the configuration as such, ejection of exhaust gas to the outside can be inhibited. Thermal damage to the surrounding components and noise by ejection can hardly occur.

In the above configuration, the exhaust pipe may further comprise a cover that covers an opening of the communication channel from the outside so as not to be exposed. According to the configuration as such, mud and water can be less likely to enter the exhaust flow channel through the communication channel.

In the above configuration, the first flow channel member and the cover may be formed of a single component. According to the configuration as such, it is possible to achieve cost reduction by reduction of the number of parts.

In the above configuration, the communication channel may communicate between the inside and outside of the exhaust pipe via a through hole formed in the second flow channel member. According to the configuration as such, it is possible to achieve a structure in which mud and water are difficult to enter the exhaust flow channel through the communication channel in a simple manner.

In the above configuration, the exhaust flow channel is a flow channel from an upstream-side opening which is an opening formed on an upstream side of a connecting part between the first flow channel member and the second flow channel member to a downstream-side opening which is an opening formed on a downstream side from the connecting part between the first flow channel member and the second flow channel member. When a flow channel length from the upstream-side opening to the downstream-side opening is L, a leading end of the insertion part of the first flow channel member may be positioned away by a length of L/6 or more from each of the upstream-side opening and the downstream-side opening. According to the configuration as such, it is possible to inhibit the air column resonance sound from a first order mode to a third order mode.

In addition to the exhaust pipe as described above, one aspect of the present invention can be implemented in various forms such as an exhaust system including the exhaust pipe as a component, an exhaust noise inhibition method, and so on.

BRIEF DESCRIPTION OF THE DRAWINGS

FIG. 5 is a perspective view showing a partial structure of a modification of the first embodiment corresponding to FIG. 3.

EXPLANATION OF REFERENCE NUMERALS

1 . . . exhaust system, 2 . . . front pipe, 3 . . . muffler, 4 . . . tail pipe, 4A . . . upstream-side opening, 4B . . . downstream-side opening, 11, 11A, 21, 21A, 21B, 31, 31A, 41 . . . first flow channel member, 12, 22, 32, 32A, 42 . . . second flow channel member, 13, 24, 33, 43 . . . mesh member, 23 . . . cover member, 111, 111A, 211, 311 . . . insertion part 121, 221, 321, 321A, 421 . . . insertion-receiving part.

MODE FOR CARRYING OUT THE INVENTION

Hereinafter, embodiments to which the present invention is applied will be described with reference to the drawings.

First Embodiment

Figure 1:
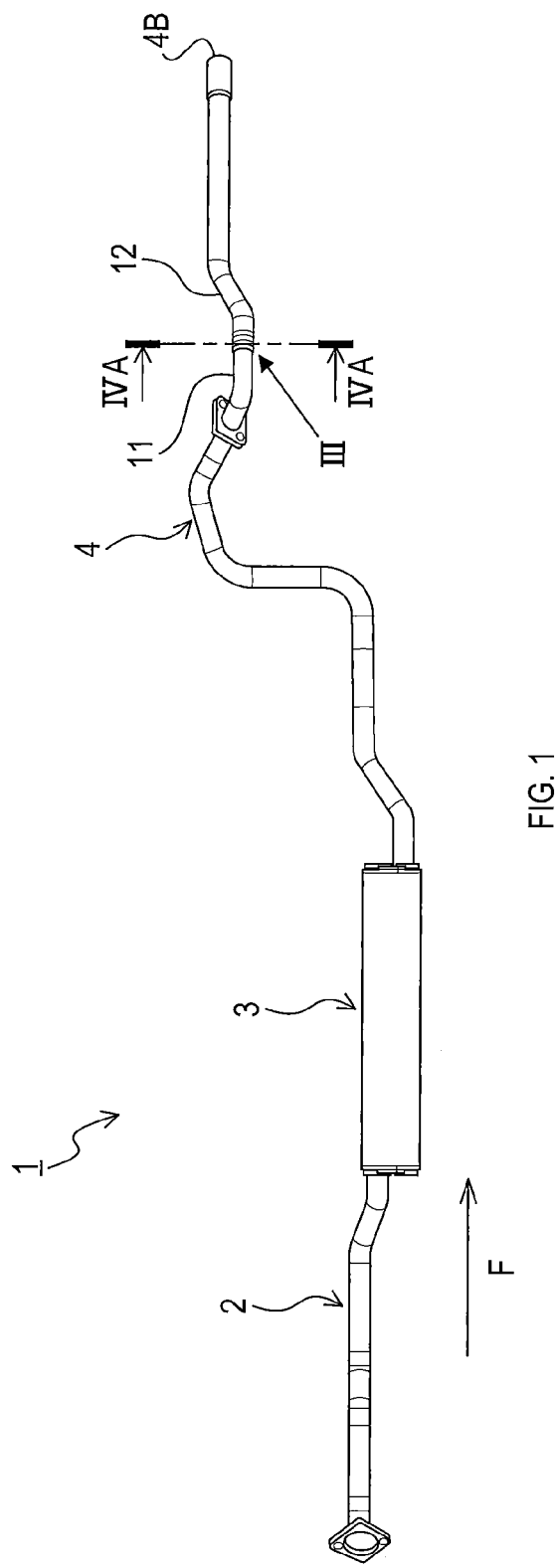
FIG. 1 is a plan view of an exhaust system of a first embodiment.

An exhaust system 1 shown in FIG. 1 is installed under a floor of a motor vehicle, and forms an exhaust flow channel which is a flow channel of exhaust gas discharged from an internal combustion engine. The exhaust system 1 comprises a front pipe 2, a muffler 3, and a tail pipe 4.

The front pipe 2 is an exhaust pipe that forms an exhaust flow channel (upstream-side exhaust flow channel) from an upstream side in an exhaust direction (direction indicated by an arrow F) of the muffler 3 to an inside of the muffler 3. Also, the tail pipe 4 is an exhaust pipe that forms an exhaust flow channel (downstream-side exhaust flow channel) having a relatively long actual length from the inside of the muffler 3 to a downstream side (in particular, downstream-side opening 4B which is an outlet of exhaust gas) of the muffler 3 in the exhaust direction.

Figure 2:
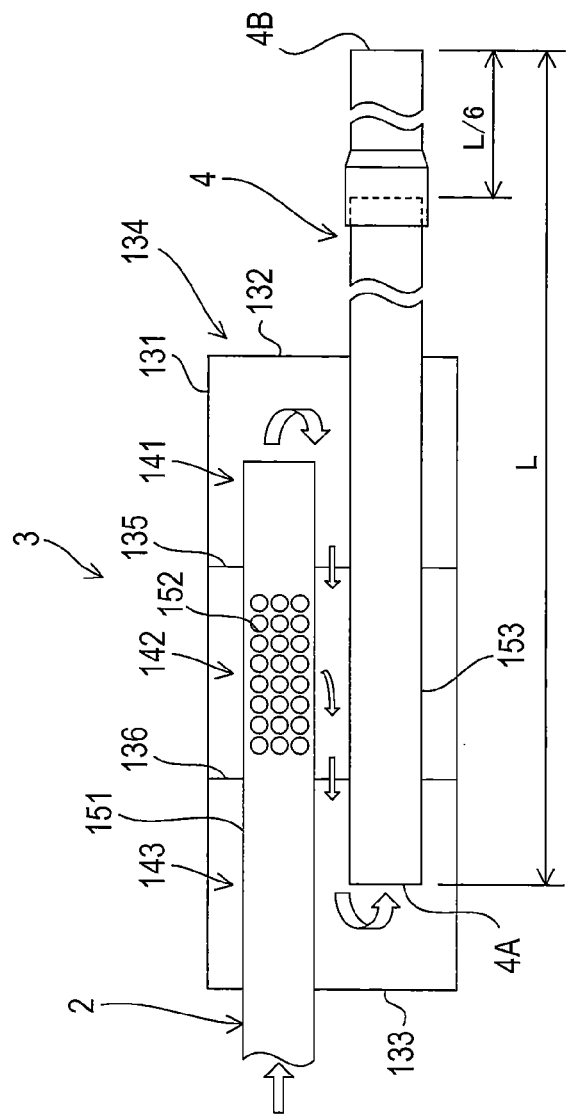
FIG. 2 is a schematic diagram showing an internal structure of a muffler.

As shown in FIG. 2, the muffler 3 is provided with a housing 134 comprising a tubular shell member 131 of which openings on both ends are closed by a rear lid member 132 and a front lid member 133. An inside of the housing 134 is partitioned into three chambers, i.e., a first chamber 141, a second chamber 142 and a third chamber 143, by a first separator 135 and a second separator 136.

The first chamber 141 is formed between the rear lid member 132 and the first separator 135. The second chamber 142 is formed between the first separator 135 and the second separator 136. The third chamber 143 is formed between the second separator 136 and the front lid member 133. Note that the first separator 135 has a communication hole that communicates between the first chamber 141 and the second chamber 142. Also, the second separator 136 has a communication hole that communicates between the second chamber 142 and the third chamber 143.

Further, the muffler 3 is provided with an inlet pipe 151 to which exhaust gas from the internal combustion engine is introduced. The inlet pipe 151 penetrates the front lid member 133, the second separator 136 and the first separator 135, and opens to the first chamber 141 at its downstream-side end. The inlet pipe 151 is part of the front pipe 2. Specifically, a downstream-side portion of the front pipe 2 functions as the inlet pipe 151. Note that, an outer circumferential surface of the inlet pipe 151 in the second chamber 142 has a plurality of through holes 152 that communicate between an internal space of the inlet pipe 151 and the second chamber 142.

Further, the muffler 3 is provided with an outlet pipe 153 that discharges exhaust gas. The outlet pipe 153 penetrates the rear lid member 132, the first separator 135 and the second separator 136, and opens to the third chamber 143 at its upstream-side end. The outlet pipe 153 is part of the tail pipe 4. Specifically, an upstream-side portion of the tail pipe 4 functions as the outlet pipe 153. In other words, the downstream-side exhaust flow channel formed by the tail pipe 4 is a flow channel from an upstream-side opening (upstream-side end) 4A of the tail pipe 4 (outlet pipe 153) to the downstream-side opening (downstream-side end) 4B.

As shown in FIG. 1, the tail pipe 4 comprises a first flow channel member 11 that forms part of the downstream-side exhaust flow channel, and a second flow channel member 12 that is connected in series with the first flow channel member 11 and forms part of the downstream-side exhaust flow channel.

Figure 3:
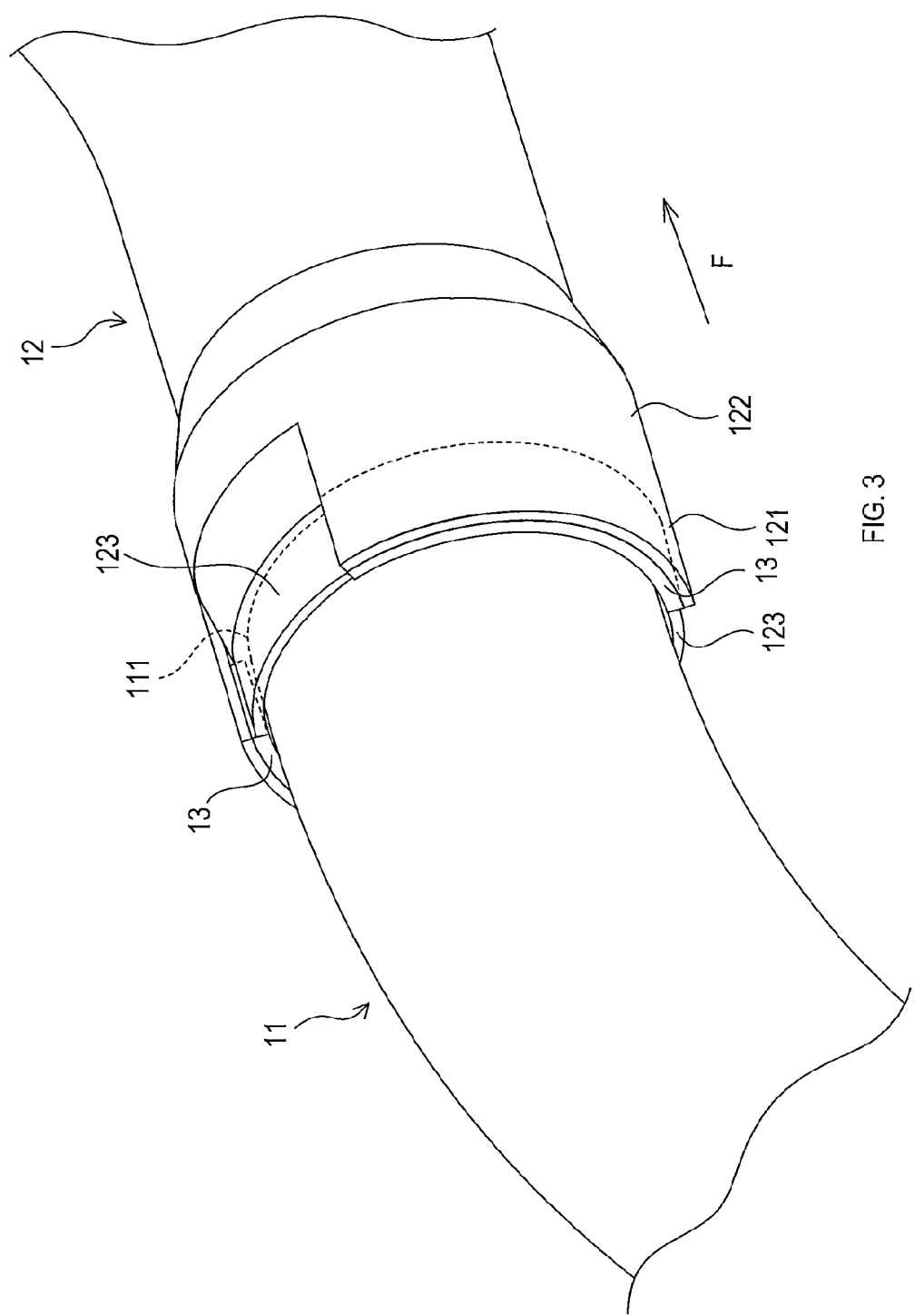
FIG. 3 is a perspective view showing a partial structure of a portion indicated by an arrow III in FIG. 1.
Figure 4B:
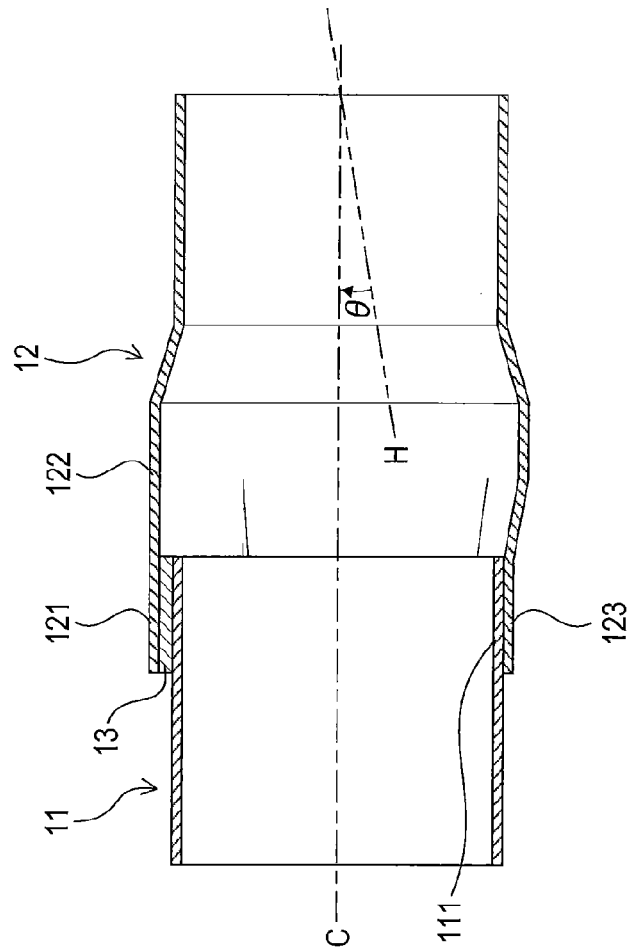
FIG. 4B is a cross sectional view taken by a line IVB-IVB of FIG. 4A.
Figure 4A:
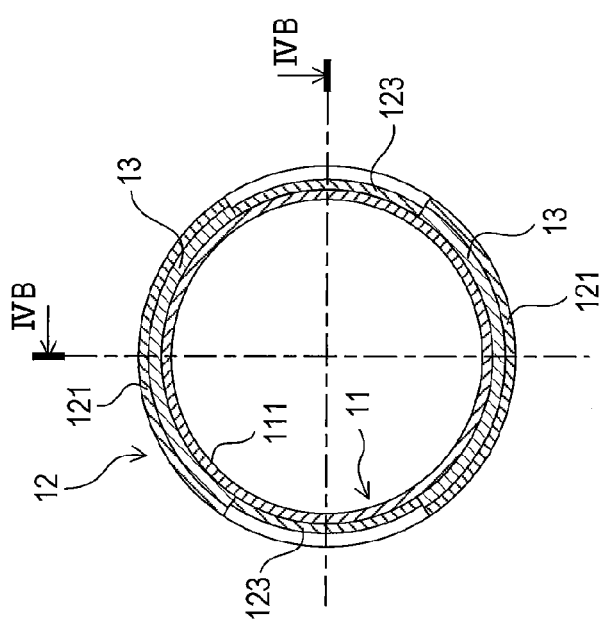
FIG. 4A is a cross sectional view taken by a line IVA-IVA of FIG. 1.

As shown in FIGS. 3, 4A and 4B, a downstream-side end of the first flow channel member 11 is inserted into an upstream-side end of the second flow channel member 12. In the following description, a portion inserted into the second flow channel member 12 of the first flow channel member 11 (portion overlapping with the second flow channel member 12 in an axial direction) is referred to as "insertion part 111". A portion of the second flow channel member 12 to which the first flow channel member 11 is inserted (portion overlapping with the first flow channel member 11 in the axial direction) is referred to as "insertion-receiving part 121".

The downstream-side end of the first flow channel member 11 (portion including the insertion part 111) is formed into a circular pipe having a constant outer diameter.

The upstream-side end of the second flow channel member 12 (portion including the insertion-receiving part 121) has an enlarged inner diameter that is larger than the outer diameter of the first flow channel member 11. In the following description, the enlarged diameter portion is referred to as "enlarged diameter part 122". The insertion part 111 is inserted into a leading end of the enlarged diameter part 122. In other words, part (leading end) of the enlarged diameter part 122 functions as the insertion-receiving part 121.

The enlarged diameter part 122 is designed to have such an inner diameter that a regular gap is formed between an outer surface (outer circumferential surface) of the insertion part 111 and an inner surface (inner circumferential surface) of the insertion-receiving part 121. However, part of the insertion-receiving part 121 in a circumferential direction has a reduced inner diameter (for example, by pressing) so that there is almost no gap between the insertion part 111 and the insertion-receiving part 121. In the following description, the reduced diameter portion is referred to as "reduced diameter part 123". In the present embodiment, two reduced diameter parts 123 are formed at equal intervals along the circumferential direction (see FIG. 4A). The first flow channel member 11 and the second flow channel member 12 are joined at the reduced diameter parts 123 (e.g., by welding).

The gap formed between the outer circumferential surface of the insertion part 111 and the inner circumferential surface of the insertion-receiving part 121 serves as a communication channel that communicates between an inside of the tail pipe 4 (exhaust flow channel) and an outside (atmosphere). In the communication channel, a mesh member (wire mesh) 13 is provided as a buffer member made of metal (e.g., stainless steel). The mesh member 13 is a band having a certain width and a certain thickness, and is curved in an arc shape along the outer circumferential surface of the insertion part 111. The mesh member 13 is provided in a manner to fill the communication channel. Since the mesh member 13 itself has air permeability, a communication state of the communication channel is ensured. In other words, the inside and outside of the tail pipe 4 are in communication with each other via the mesh member 13.

Due to the communication channel formed as such, a connecting part between the first flow channel member 11 and the second flow channel member 12 functions as a muffler. In order to enhance silencing effect, an opening of the communication channel as viewed from the exhaust flow channel, in other words, the downstream-side end of the first flow channel member 11, is designed to be arranged at a position having a maximum sound pressure of air column resonance sound. In the present embodiment, when a flow channel length from the upstream-side opening 4A of the tail pipe 4 to the downstream-side opening 4B is L, the leading end of the insertion part 111 is positioned away by a length of L/6 (position having the maximum sound pressure of the third order mode) from the downstream-side opening (see FIG. 2). When one or more through holes are formed in the outlet pipe 153, the through hole at the most downstream side is assumed as the upstream-side opening and then the flow channel length L is determined.

Pressure in the inside of the tail pipe 4 (exhaust flow channel) becomes negative as compared with the outside (atmosphere) due to flow of exhaust gas. Thus, leakage of exhaust gas from the communication channel hardly occurs. However, it is conceivable that condensed water generated in the exhaust pipe may be drained from the communication channel. Therefore, the tail pipe 4, in a state where the motor vehicle is present on a horizontal plane H (plane perpendicular to the direction of gravity), is arranged such that the insertion-receiving part 121 faces higher than a horizontal direction (direction perpendicular to the direction of gravity). Specifically, the tail pipe 4 is arranged such that a central axis C of the insertion-receiving part 121 has an inclination of an angle $\theta$ ($0°<\theta\leq90°$) with respect to the horizontal plane H.

According to the first embodiment described above, the following effects can be obtained.

[1A] Since the communication channel is formed that communicates between the inside and outside of the tail pipe 4, sound pressure in the pipe when air-column resonance sound is generated is depressurized. Thus, it becomes possible to inhibit standing waves. Moreover, since the insertion-receiving part 121 is arranged to face higher than the horizontal direction, condensed water generated in the tail pipe 4 can be less likely to be drained in the middle of the tail pipe 4.

[1B] The mesh member 13 is provided in the communication channel. The inside and outside of the tail pipe 4 are in communication with each other via the mesh member 13. Therefore, it is possible to reduce a flow channel area of the communication channel. It is also possible to inhibit ejection of the exhaust gas to the outside. In addition, absorption of heat of the exhaust gas by the mesh member 13 and sound absorption of a high-frequency component by the mesh member 13 can make it difficult to cause thermal damage to the surrounding parts by ejection of the exhaust gas and noise.

[1C] The leading end of the insertion part 111 of the first flow channel member 11 is positioned away by a length of L/6 from the downstream-side opening. Thus, it is possible to effectively inhibit air column resonance sound of a third order mode.

[1D] The flow channel area is not narrowed at the connecting part of the first flow channel member 11 and the second flow channel member 12. Thus, it is possible to make it difficult to block the flow of the exhaust gas. It is also possible to inhibit exhaust resistance.

Figure 6:
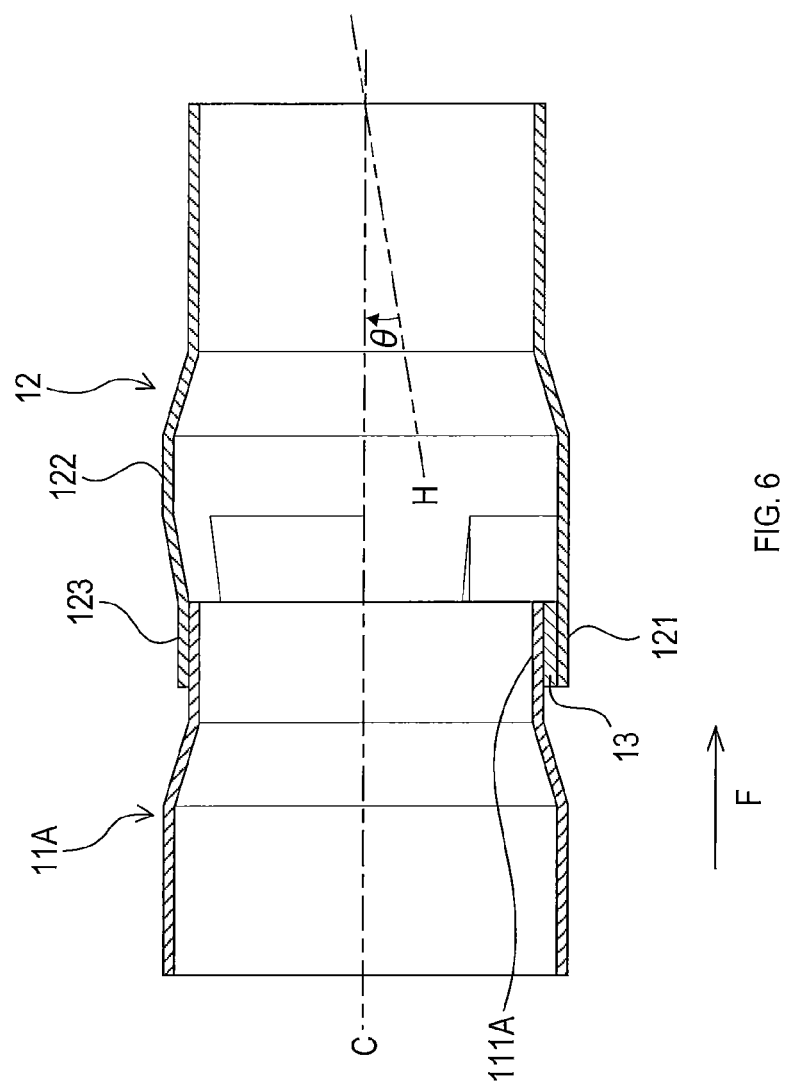
FIG. 6 is a sectional view showing a partial structure of a modification of the first embodiment corresponding to FIG. 4B.

In the first embodiment, the downstream-side end of the first flow channel member 11 is formed into a circular pipe having a constant outer diameter, but is not limited thereto. For example, as shown in FIGS. 5 and 6, a first flow channel member 11A may be formed by a circular pipe material having a larger outer diameter than that of the first flow channel member 11 of the first embodiment. A downstream-side end (portion including an insertion part 111A) of the first flow channel member 11A may be formed to have a smaller outer diameter than the inner diameter of the upstream-side end (insertion-receiving part 121) of the second flow channel member 12. According to the configuration as such, pressure in the vicinity of the communication channel becomes negative by increase in flow velocity of the exhaust gas due to the reduced diameter shape. Thus, effect of inhibiting ejection of the exhaust gas to the outside is improved. Thermal damage and noise can be further reduced.

Second Embodiment

Figure 7:
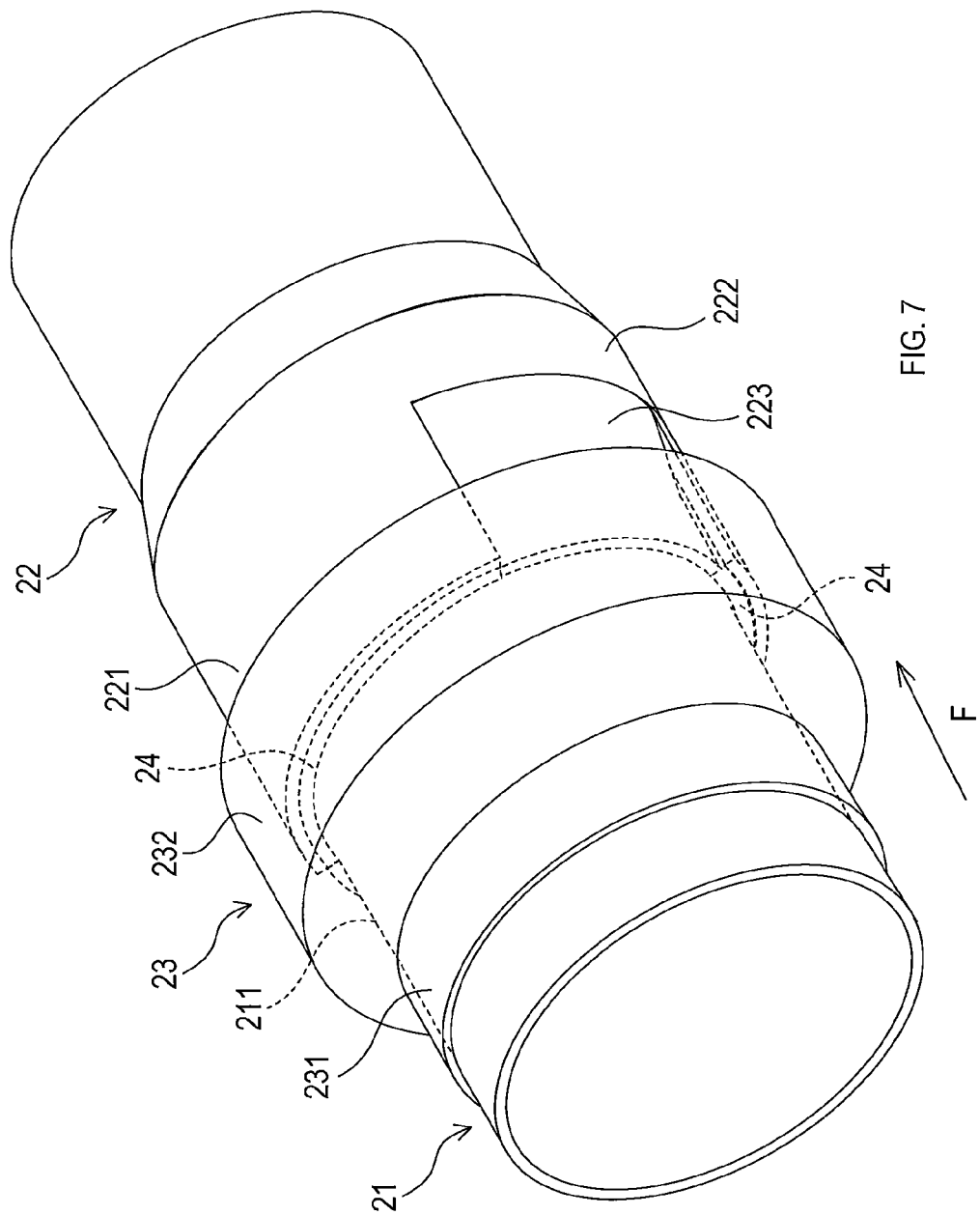
FIG. 7 is a perspective view showing a partial structure of a second embodiment corresponding to FIG. 3.
Figure 8:
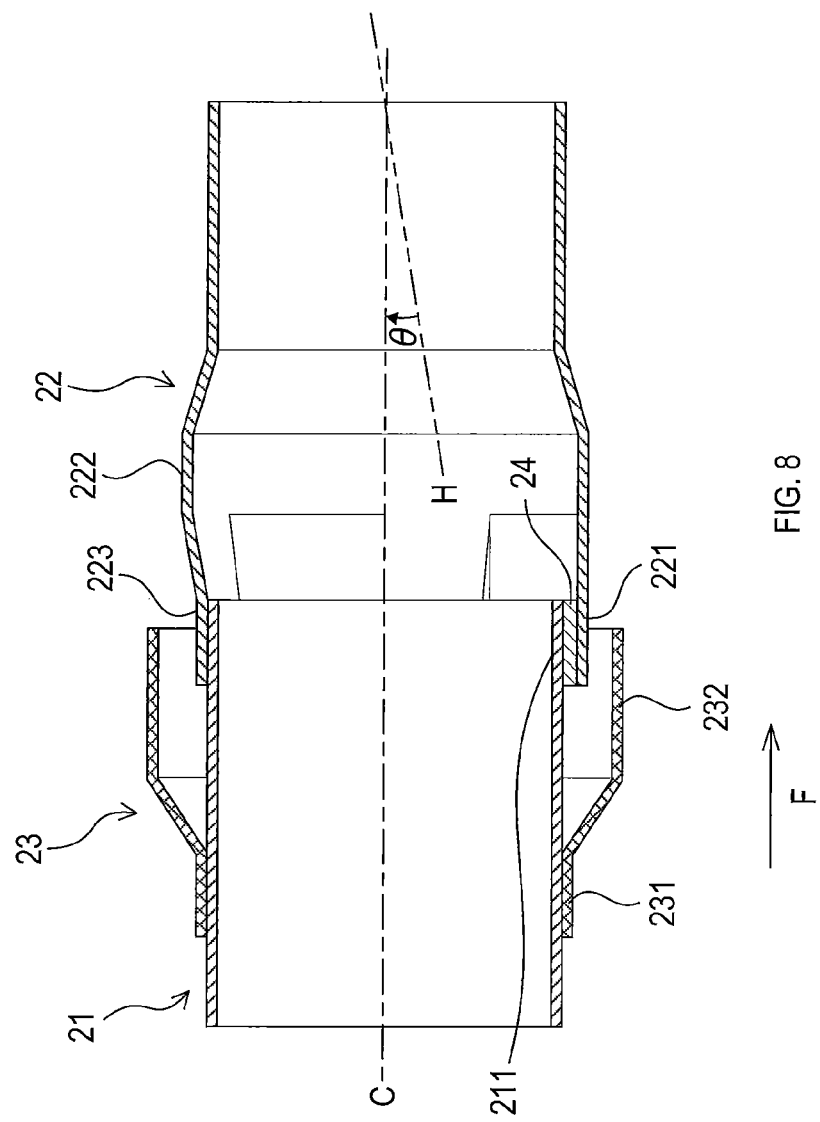
FIG. 8 is a sectional view showing a partial structure of the second embodiment corresponding to FIG. 4B.

The second embodiment is basically the same as the first embodiment in configuration, and differs from the first embodiment in that a first flow channel member 21 and a second flow channel member 22 shown in FIGS. 7 and 8 are employed in place of the first flow channel member 11 and the second flow channel member 12 described above (FIGS. 3, 4A and 4B), and that a cover member 23 is further provided. Thus, the description on the configuration common to the both embodiments will not be repeated. Mainly the differences will be described.

As shown in FIGS. 7 and 8, a downstream-side end of the first flow channel member 21 is inserted into an upstream-side end of the second flow channel member 22, similar to the first embodiment. In the following description, a portion of the first flow channel member 21 inserted into the second flow channel member 22 is referred to as "insertion part 211", and a portion of the second flow channel member 22 to which the first flow channel member 21 is inserted is referred to as "insertion-receiving part 221".

The downstream-side end of the first flow channel member 21 (portion including the insertion part 211) is formed into a circular pipe having a constant outer diameter.

Similar to the first embodiment, the upstream-side end of the second flow channel member 22 (portion including the insertion-receiving part 221) has an enlarged inner diameter larger than an outer diameter of the insertion part 211. In the following description, the enlarged diameter portion is referred to as "enlarged diameter part 222". The insertion part 211 is inserted into a leading end of the enlarged diameter part 222. In other words, part (leading end side) of the enlarged diameter part 222 functions as the insertion-receiving part 221.

Similar to the first embodiment, the enlarged diameter part 222 is designed to have such an inner diameter that a regular gap is formed between an outer circumferential surface of the insertion part 211 and an inner circumferential surface of the insertion-receiving part 221. Part of the insertion-receiving part 221 in a circumferential direction has a reduced inner diameter so that there is almost no gap between the insertion part 211 and the insertion-receiving part 221. In the following description, the reduced diameter portion is referred to as "reduced diameter part 223". Similar to the first embodiment, the two reduced diameter parts 223 are formed at equal intervals in the circumferential direction. The first flow channel member 21 and the second flow channel member 22 are joined at the reduced diameter parts 223 (for example, by welding).

The cover member 23 is intended for covering an opening on an atmosphere side of the communication channel from outside so as not to be exposed. The cover member 23 comprises a fixing part 231 formed into a circular pipe to be joined (e.g., welded) to an outer circumferential surface of the first flow channel member 21, and a cover part 232 formed into a circular pipe having a larger outer diameter than that of the fixed part 231. The cover part 232 is formed to have a larger inner diameter than an outer diameter of the enlarged diameter part 222, and is arranged to overlap with a leading end of the enlarged diameter part 222 (insertion-receiving part 221) in an axial direction. In other words, the cover part 232 covers the opening of the communication channel in a manner not to block the communication channel.

Further, similar to the first embodiment, a mesh member 24 is provided in a gap (communication channel) formed between the outer circumferential surface of the insertion part 211 and the inner circumferential surface of the insertion-receiving part 221. Similar to the first embodiment, the tail pipe 4 is arranged such that the insertion-receiving part 221 faces higher than a horizontal direction of the motor vehicle.

According to the second embodiment described above, in addition to the effects of the first embodiment described above, the following effect can be obtained.

[2A] Since the cover member 23 is provided that covers the opening of the communication channel from the outside so as not to be exposed, it is possible for mud and water to be less likely to enter the exhaust flow channel through the communication channel.

Figure 9:
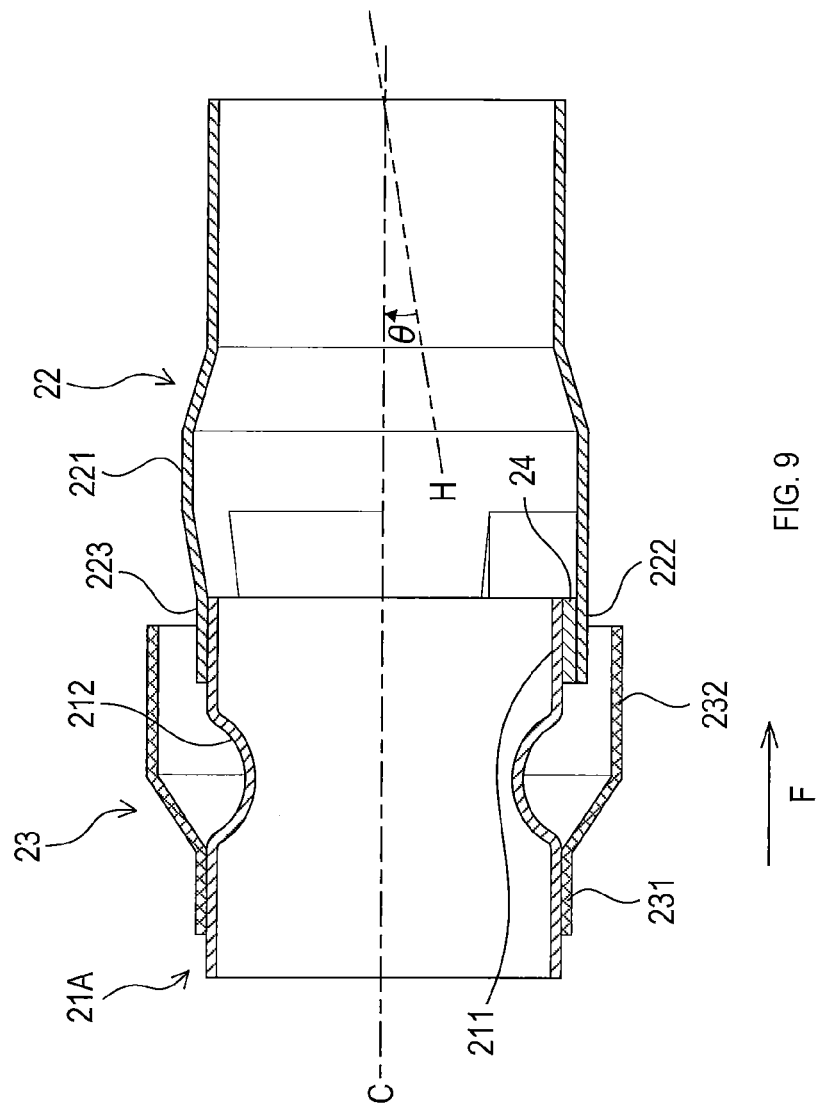
FIG. 9 is a sectional view showing a partial structure of a first modification of the second embodiment corresponding to FIG. 4B.

In the second embodiment, a downstream-side end of the first flow channel member 21 is formed into a circular pipe having a constant outer diameter, but is not limited thereto. For example, as shown in FIG. 9, a constricted part 212 having a shape in which a portion in an axial direction of the first channel member 21A is recessed radially inward over an entire circumference of the portion may be formed on an upstream side of the insertion part 211 of the first flow channel member 21A. According to the configuration as such, pressure in the vicinity of the communication channel becomes negative by increase in flow velocity of the exhaust gas caused by the constricted part 212. Thus, effect of inhibiting ejection of the exhaust gas to the outside is improved. Thermal damage and abnormal noise can be further reduced.

Figure 10:
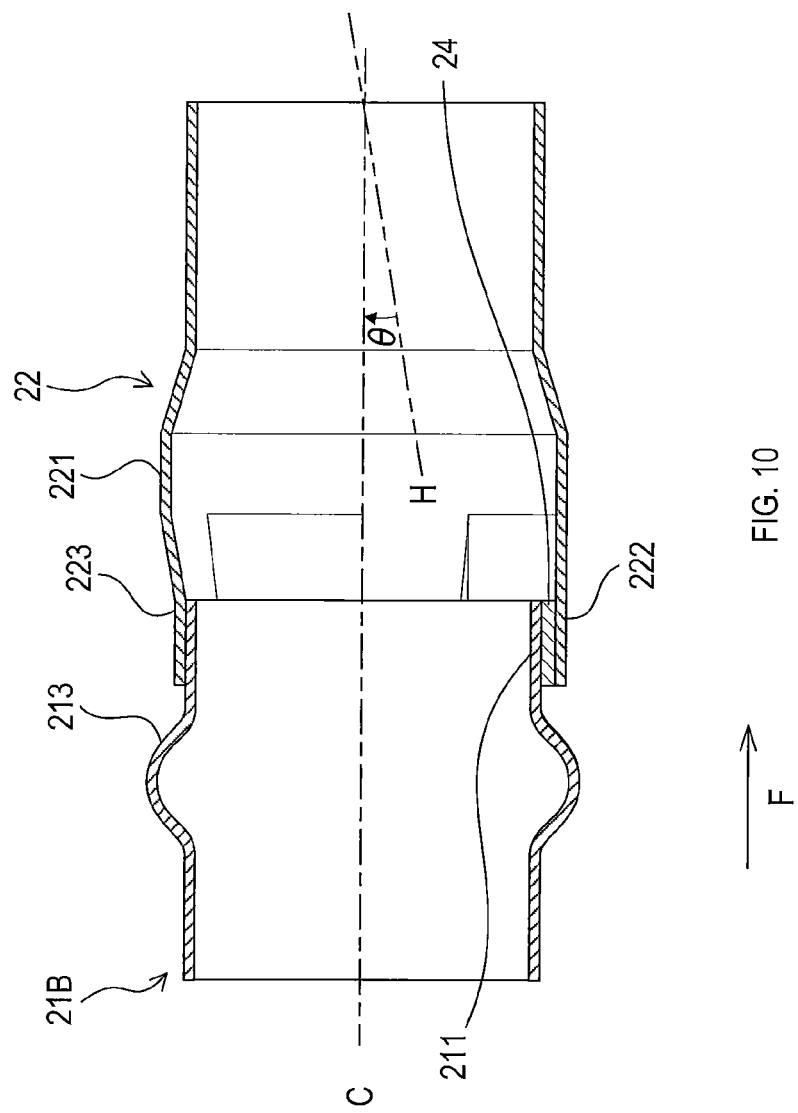
FIG. 10 is a sectional view showing a partial structure of a second modification of the second embodiment corresponding to FIG. 4B.

As shown in FIG. 10, for example, an expansion part 213 having a shape in which a portion in an axial direction of the first channel member 21B projects radially outward over an entire circumference of the portion may be formed on an upstream side of the insertion part 211 of the first flow channel member 21B. According to the configuration as such, even if the cover member 23 is not provided, the expansion part 213 can make it difficult for mud and water to enter the exhaust flow channel through the communication channel.

Third Embodiment

Figure 11:
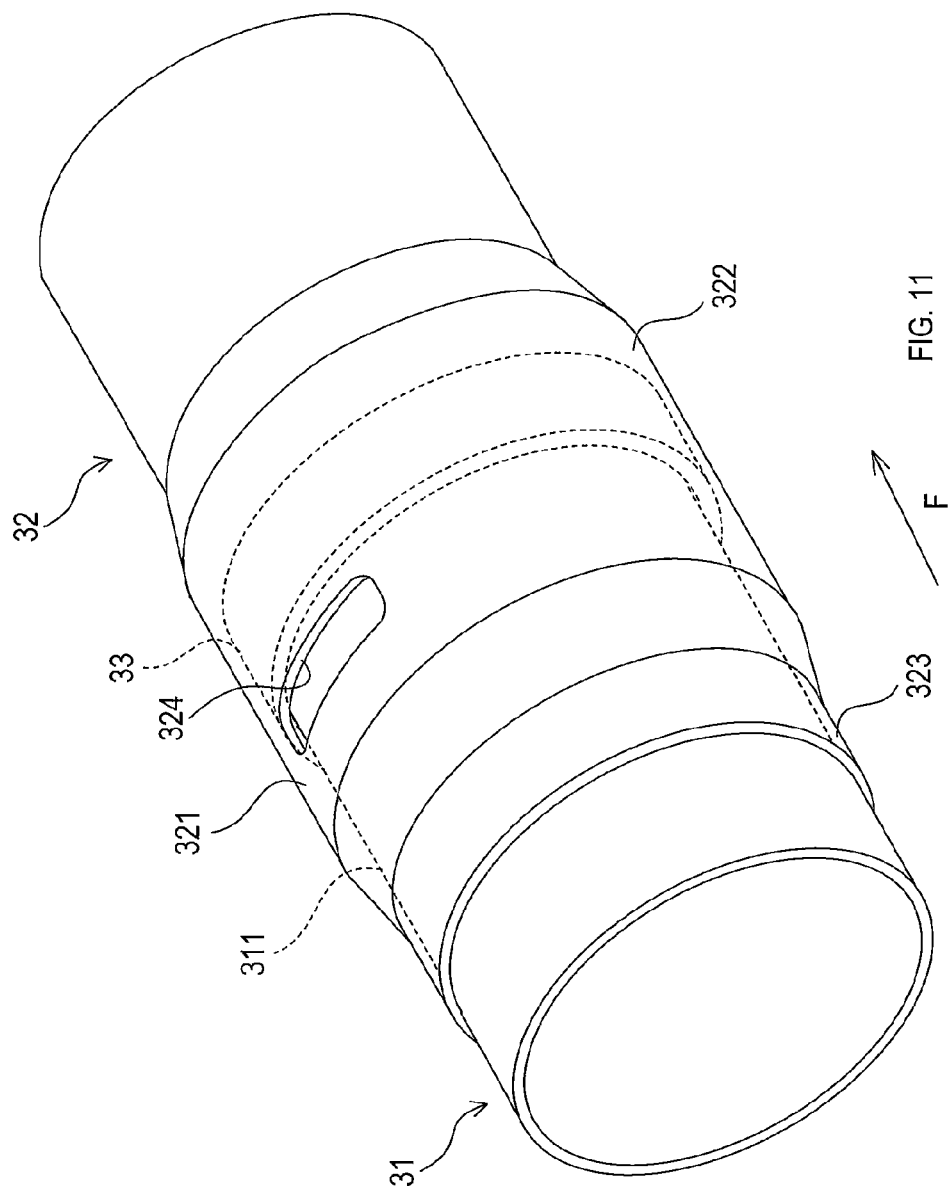
FIG. 11 is a perspective view showing a partial structure of a third embodiment corresponding to FIG. 3.
Figure 12:
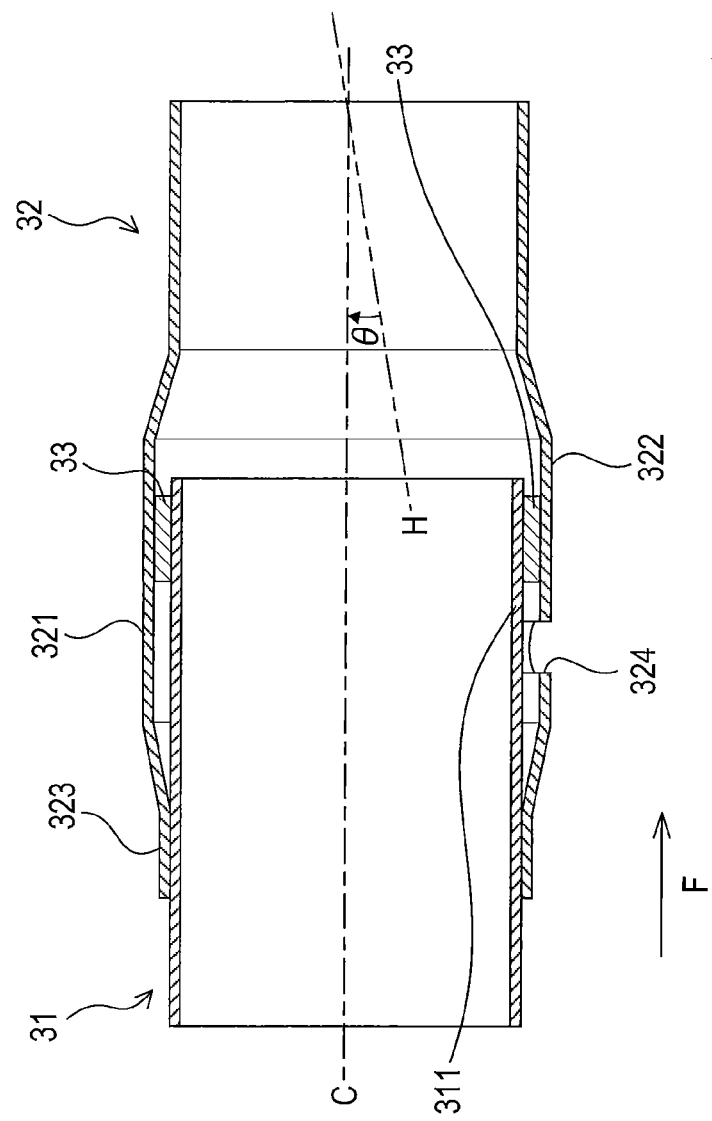
FIG. 12 is a sectional view showing a partial structure of the third embodiment corresponding to FIG. 4B.

The third embodiment is basically the same as the first embodiment in configuration, and differs from the first embodiment in that a first flow channel member 31 and a second flow channel member 32 shown in FIGS. 11 and 12 are employed in place of the first flow channel member 11 and the second flow channel member 12 described above (FIGS. 3, 4A and 4B). Thus, the description on the configuration common to the both embodiments will not be repeated. Mainly the differences will be described.

As shown in FIGS. 11 and 12, a downstream-side end of the first flow channel member 31 is inserted into an upstream-side end of the second flow channel member 32, similar to the first embodiment. In the following description, a portion of the first flow channel member 31 inserted into the second flow channel member 32 is referred to as "insertion part 311", and a portion of the second flow channel member 32 to which the first flow channel member 31 is inserted is referred to as "insertion-receiving part 321".

A downstream-side end of the first flow channel member 31 (portion including the insertion part 311) is formed into a circular pipe having a constant outer diameter.

Similar to the first embodiment, an upstream-side end of the second flow channel member 32 (portion including the insertion-receiving part 321) has an enlarged inner diameter larger than an outer diameter of the insertion part 311. In the following description, the enlarged diameter portion is referred to as "enlarged diameter part 322". The insertion part 311 is inserted into a leading end of the enlarged diameter part 322. In other words, part of the enlarged diameter part 322 (leading end side) functions as the insertion-receiving part 321.

Similar to the first embodiment, the enlarged diameter part 322 is designed to have such an inner diameter that a regular gap is formed between an outer circumferential surface of the insertion part 311 and an inner circumferential surface of the insertion-receiving part 321. However, in the third embodiment, a leading end 323 of the insertion-receiving part 321 has a reduced inner diameter such that there is almost no gap between the insertion part 311 and the insertion-receiving part 321. The first flow channel member 31 and the second flow channel 32 are joined at an entire circumference of the leading end 323 (for example, by welding). Therefore, the insertion-receiving part 321 has a through-hole 324 for communication between the inside and outside of the tail pipe 4. A mesh member 33 is provided over an entire circumference of the gap (communication channel) formed between the outer circumferential surface of the insertion part 311 and the inner circumferential surface of the insertion-receiving part 321. The inside and outside of the tail pipe 4 are in communication with each other via the mesh member 33. Similar to the first embodiment, the tail pipe 4 is arranged such that the insertion-receiving part 321 faces higher than a horizontal direction in the vehicle.

According to the third embodiment described above, in addition to the effects of the first embodiment described above, the following effects can be obtained.

[3A] The opening of the communication channel is covered from the outside by the second flow channel member 32. The inside and outside of the tail pipe 4 are in communication with each other via the through hole formed in the second flow channel member 32. Therefore, it is possible to achieve a structure difficult for mud or water to enter the exhaust flow channel through the communication channel in a simple manner.

[3B] Since the cover that covers the opening of the communication channel from the outside and the second flow channel member 32 are formed of a single component, the number of parts is reduced as compared with a case of forming the cover as a separate part. Thus, it is possible to reduce costs.

Figure 13:
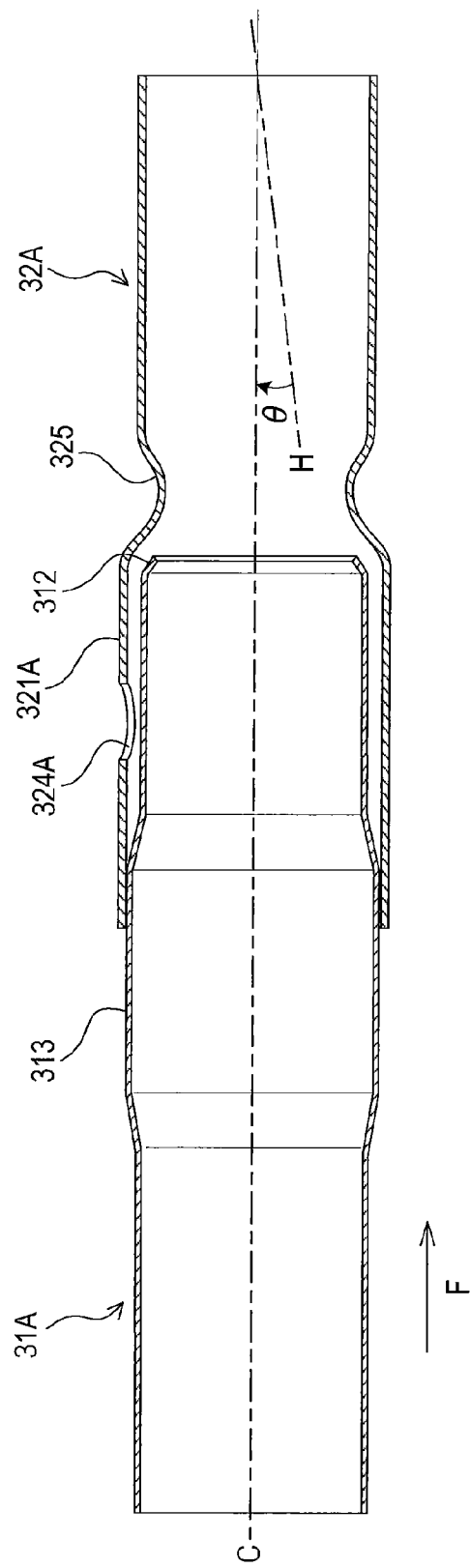
FIG. 13 is a sectional view showing a partial structure of a modification of the third embodiment corresponding to FIG. 4B.

In the third embodiment, the downstream-side end of the first flow channel member 31 (insertion part 311) is formed into a circular pipe having a constant outer diameter and the upstream side leading end 323 of the second flow channel member 32 has a reduced diameter, but are not limited thereto. For example, as shown in FIG. 13, an enlarged diameter part 313 may be formed at a downstream-side end of a first flow channel member 31A and upstream of a leading end 312, so that a portion from the leading end 312 to part of the enlarged diameter part 313 may be inserted into the upstream-side end (insertion-receiving part 321A) of a second flow channel member 32A. The outer diameter of the enlarged diameter part 313 is enlarged in a manner that there is almost no gap between the first flow channel member 31A and the insertion-receiving part 321A. The first flow channel member 31A and the second flow channel member 32A are joined (welded) at an entire circumference of the enlarged diameter part 313. According to the configuration as such, there is no need to reduce the diameter of the upstream side leading end of the second flow channel member 32A.

Further, for example, as shown in FIG. 13, the leading end 312 of the first flow channel member 31A may have a reduced diameter. According to the configuration as such, a flow rate of exhaust gas flowing from the first flow channel member 31A to the second flow channel member 32A is increased. Since pressure in the vicinity of the communication channel (gap formed between the first flow channel member 31A and the second flow channel member 32A) becomes negative, effect of inhibiting ejection of the exhaust gas to the outside is improved. Thermal damage and noise can be further reduced.

Further, for example, as shown in FIG. 13, a constricted part 325 having a shape in which a portion in an axial direction of the second flow channel member 32A is recessed radially inward over an entire circumference of the portion may be formed on a downstream side of the insertion-receiving part 321A of the second flow channel member 32A. The smallest inner diameter of the constricted part 325 is formed smaller than an inner diameter of the leading end 312 of the first flow channel member 31A. According to the configuration as such, even if the exhaust gas flows back upon pulsation at the time of low back pressure, it is possible to make it difficult for the backflow of the exhaust gas to enter the communication channel.

Although not shown in FIG. 13, a mesh member may be provided in the communication channel to a through-hole 324A formed in the insertion receiving part 321A, similar to the third embodiment.

Fourth Embodiment

Figure 14:
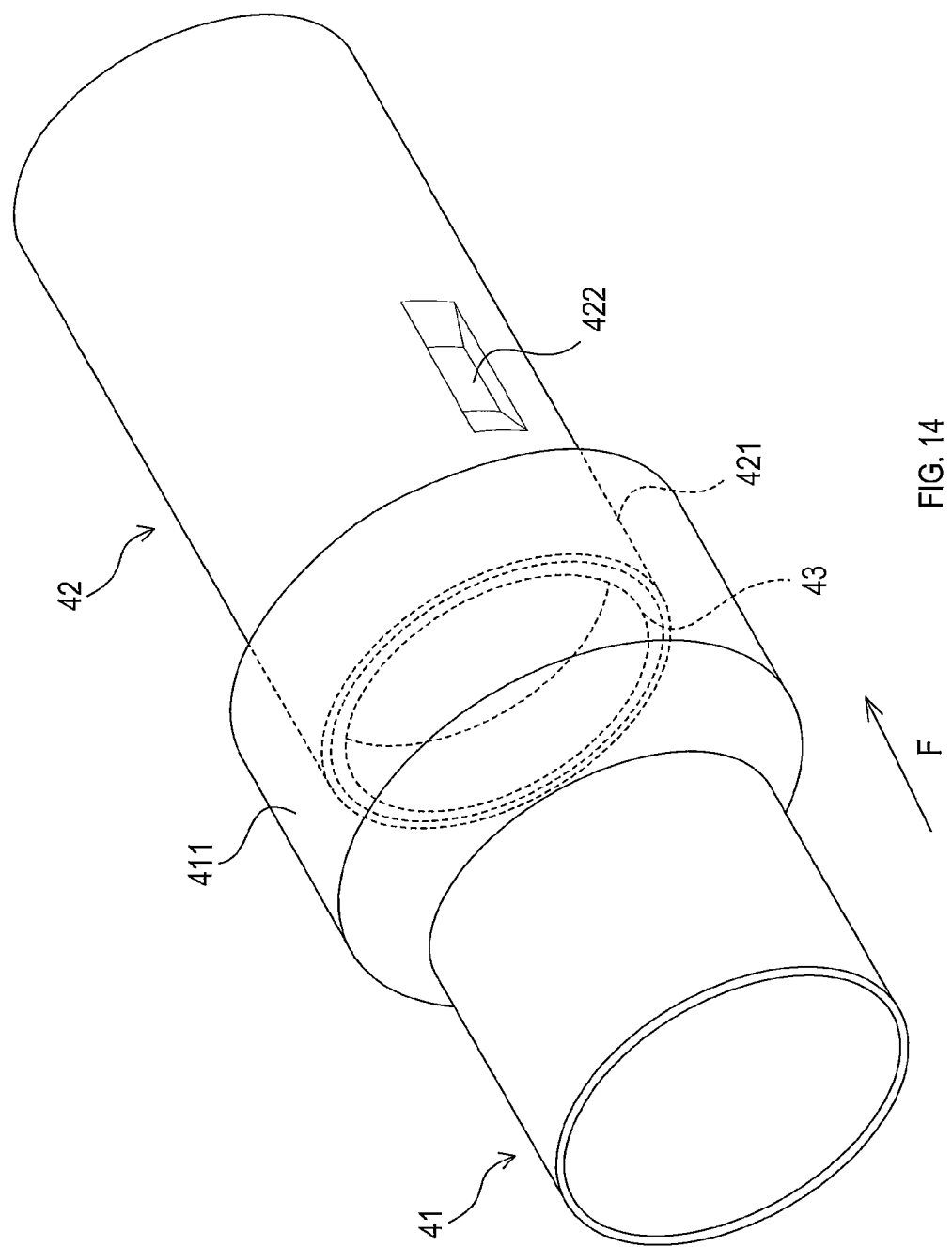
FIG. 14 is a perspective view showing a partial structure of a fourth embodiment corresponding to FIG. 3.
Figure 15:
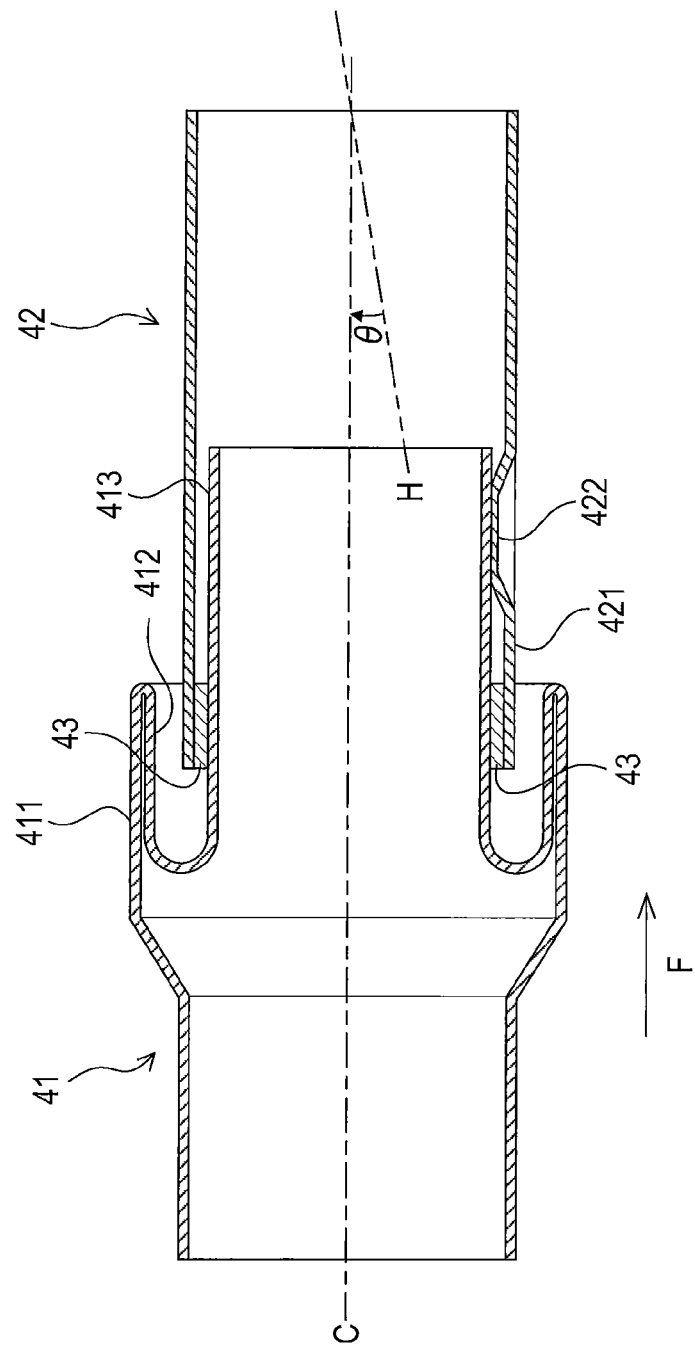
FIG. 15 is a sectional view showing a partial structure of the fourth embodiment corresponding to FIG. 4B.

The fourth embodiment is basically the same as the first embodiment in configuration, and differs from the first embodiment in that a first flow channel member 41 and a second flow channel member 42 shown in FIGS. 14 and 15 are employed in place of the first flow channel member 11 and the second flow channel member 12 described above (FIGS. 3, 4A and 4B). Thus, the description on the configuration common to the both embodiments will not be repeated. Mainly the differences will be described.

As shown in FIGS. 14 and 15, a downstream-side end of the first flow channel member 41 is inserted into an upstream-side end of the second flow channel member 42, similar to the first embodiment.

The downstream-side end of the first flow channel member 41 has an enlarged diameter part 411, a folded part 412 obtained by folding back inward a leading end of the enlarged diameter part 411, a thin pipe part 413 obtained by folding back inward the folded part 412.

The upstream-side end of the second flow channel member 42 is formed into a circular pipe having a constant outer diameter. However, a recess 422 is formed in an insertion-receiving part 421 which is a portion of the second flow channel member 42 to which the first flow channel member 41 is inserted. The first flow channel member 41 and the second flow channel member 42 are joined at the recess 422 (for example, by welding).

The thin pipe part 413 is formed to have a smaller outer diameter than an inner diameter of the insertion-receiving part 421. A regular gap (communication channel) is formed between an outer circumferential surface of the thin pipe part (insertion part) 413 and an inner circumferential surface of the insertion-receiving part 421. A mesh member 43 is provided over an entire circumference of the gap. The inside and outside of the tail pipe 4 are in communication with each other via the mesh member 43.

The folded part 412 is formed to have a larger inner diameter than an outer diameter of the insertion-receiving part 421 and arranged to overlap with a leading end of the insertion-receiving part 421 in an axial direction. The folded part 412 has a function as a cover that covers the opening of the communication channel from the outside so as not to be exposed. Similar to the first embodiment, the tail pipe 4 is arranged such that the insertion-receiving part 421 faces higher than the horizontal direction in the motor vehicle.

According to the fourth embodiment described above, in addition to the effects [1A] to [1C] of the first embodiment described above, the following effect can be obtained.

[4A] Since the cover that covers the opening of the communication channel from the outside and the first flow channel member 41 are formed of a single component, the number of parts is reduced as compared with a case of forming the cover as a separate part. Thus, it is possible to reduce costs.

Other Embodiments

Embodiments of the present invention have been described in the above. However, it goes without saying that the present invention may be embodied in various forms without being limited to the above embodiments.

[5A] In the above embodiments, the opening of the communication channel as viewed from the exhaust flow channel is set to be positioned away by a length of L/6 from the downstream-side opening 4B, but is not limited thereto. The opening of the communication channel may be set at a position having a maximum sound pressure of air column resonance sound. For example, the opening of the communication channel may be set at other positions of a maximum sound pressure of a third order mode, that is, a position away by a length of 3/6 (1/2) or 5/6 (position away by a length of 1/6 from the upstream-side opening 4A) from the downstream-side opening 4B. Also, the opening of the communication channel may be set at a position having a maximum sound pressure of a second order mode, that is, a position away by a length of ¼ or ¾ from the downstream-side opening 4B. In addition, the opening of the communication channel may be set at a position having a maximum sound pressure of a first order mode, that is, a position away by a length of ½ from the downstream-side opening 4B. In other words, arrangement away by a length of L/6 or more from each of the upstream-side opening 4A and the downstream-side opening 4B can inhibit air column resonance sound at least from the first to third order modes (modes with high demands of sound deadening).

[5B] The shape, arrangement, number, etc. of the mesh member, are not particularly limited. In addition, it is not necessary to provide the mesh member in the communication channel.

[5C] Each of the components of the present invention is conceptual, and is not limited to the component in the above embodiments. For example, the function of a single component may be dispersed to a plurality of components, or the functions of multiple components may be integrated to a single component. Furthermore, at least part of the configuration of the above embodiments may be replaced with known configurations having similar functions. Furthermore, at least part of the configuration of the above embodiments may be added to, replaced with or the like the configuration of the other embodiments described above.

An aspect of the present invention solves the following problem. According to the configuration described in Japanese Patent No. 4159032, it is possible to inhibit the air column resonance sound by the extremely simple configuration in which a communication hole (perforation) is formed which communicates between an inside and an outside of the exhaust pipe (conduit). However, there is a problem in that draining of condensed water generated in the exhaust pipe from the communicating hole located in the middle of the exhaust pipe can be misunderstood as a failure due to a sense of discomfort resulting from the appearance.

In one aspect of the present invention, it is desirable that sound pressure in the pipe when the air-column resonance sound is generated can be depressurized so as to inhibit standing waves, and that the condensed water is less likely to be drained while the inside and outside of the exhaust pipe are in communication with each other.

The invention claimed is:

1. An exhaust pipe that forms an exhaust flow channel, the exhaust pipe comprising:
    a first flow channel member that forms part of the exhaust flow channel; and
    a second flow channel member that is connected in series with the first flow channel member and forms part of the exhaust flow channel,
    a downstream-side end of the first flow channel member being inserted into an upstream-side end of the second flow channel member,
    a communication channel that communicates between an inside and an outside of the exhaust pipe being formed between an outer surface of an insertion part of the first flow channel member and an inner surface of an insertion-receiving part of the second flow channel member,
    wherein the insertion-receiving part is arranged to face higher than a horizontal direction, and
    wherein the exhaust flow channel is a flow channel from an upstream side opening which is an opening formed on an upstream side of a connecting part between the first flow channel member and the second flow channel member to a downstream side opening which is an opening formed on a downstream side of the connecting part between the first flow channel member and the second flow channel member, and, when a flow channel length from the upstream-side opening to the downstream-side opening is L, a leading end of the insertion part of the first flow channel member is positioned away by a length of L/6 or more from each of the upstream-side opening and the downstream-side opening.

2. An exhaust pipe according to claim 1, further comprising a mesh member provided in the communication channel, wherein the inside and outside of the exhaust pipe are in communication with each other via the mesh member.

3. An exhaust pipe according to claim 1, further comprising a cover that covers an opening of the communication channel from the outside so as not to be exposed.

4. An exhaust pipe according to claim 3, wherein the first flow channel member and the cover are formed of a single component.

5. An exhaust pipe according to claim 1, wherein the communication channel communicates between the inside and outside of the exhaust pipe via a through hole formed in the second flow channel member.

6. An exhaust pipe according to claim 1, wherein the communication channel communicates between the inside and outside of the exhaust pipe via an opening formed between a leading end of the insertion-receiving part and the outer surface of the insertion part.

7. An exhaust pipe according to claim 1, wherein the first flow channel member and the second flow channel member are joined at the insertion part and the insertion-receiving part.

8. An exhaust pipe according to claim 7, wherein the insertion-receiving part includes a reduced diameter part having a reduced inner diameter that corresponds to the outer diameter of the insertion part, and the first flow channel member and the second flow channel member are joined at the reduced diameter part.

9. An exhaust pipe according to claim 1, wherein a portion that is the upstream-side end of the second flow channel member and that includes the insertion-receiving part has a larger inner diameter than the outer diameter of the insertion part.

10. An exhaust pipe according to claim 1, wherein the insertion part is arranged such that center axes of the insertion part and of the insertion-receiving part coincide with each other.

11. An exhaust pipe according to claim 1, wherein the exhaust pipe forms an exhaust flow channel from an inside of a muffler to an exhaust gas outlet in an exhaust system for a motor vehicle.

12. An exhaust pipe according to claim 1, comprising a constricted part having a shape in which a portion in an axial direction of the first channel member is recessed radially inward over an entire circumference of the portion on an upstream side of the insertion part of the first channel member.

13. An exhaust pipe according to claim 1, comprising an expansion part having a shape in which a portion in an axial direction of the first channel member projects radially outward over an entire circumference of the portion on an upstream side of the insertion part of the first flow channel member.

14. An exhaust pipe according to claim 4, wherein the downstream-side end of the first flow channel member includes an enlarged diameter part, a folded part obtained by folding back inward a leading end of the enlarged diameter part, and a thin pipe part obtained by folding back inward the folded part, the thin pipe part is inserted into the upstream side end of the second flow channel member, the thin pipe part being formed to have a smaller outer diameter than an inner diameter of the insertion part so that a regular gap is formed between an outer circumferential surface of the thin pipe part and an inner circumferential surface of the insertion-receiving part as the communication flow channel, the folded part is formed to have a larger inner diameter than an outer diameter of the insertion-receiving part, the folded part being arranged to overlap with a leading end of the insertion-receiving part in an axial direction, thereby to function as the cover.

15. An exhaust pipe that forms an exhaust flow channel, the exhaust pipe comprising:

a first flow channel member that forms part of the exhaust flow channel; and a second flow channel member that is connected in series with the first flow channel member and forms part of the exhaust flow channel, a downstream-side end of the first flow channel member being inserted into an upstream-side end of the second flow channel member, a communication channel that communicates between an inside and an outside of the exhaust pipe being formed between an outer surface of an insertion part of the first flow channel member and an inner surface of an insertion-receiving part of the second flow channel member, wherein the insertion-receiving part is arranged to face higher than a horizontal direction, and a cover that covers an opening of the communication channel from the outside so as not to be exposed, wherein the first flow channel member and the cover are formed of a single component, wherein the downstream-side end of the first flow channel member includes an enlarged diameter part, a folded part obtained by folding back inward a leading end of the enlarged diameter part, and a thin pipe part obtained by folding back inward the folded part, wherein the thin pipe part is inserted into the upstream side end of the second flow channel member, the thin pipe part being formed to have a smaller outer diameter than an inner diameter of the insertion part so that a regular gap is formed between an outer circumferential surface of the thin pipe part and an inner circumferential surface of the insertion-receiving part as the communication flow channel, and wherein the folded part is formed to have a larger inner diameter than an outer diameter of the insertion-receiving part, the folded part being arranged to overlap with a leading end of the insertion-receiving part in an axial direction, thereby to function as the cover.

16. An exhaust pipe according to claim 15, further comprising a mesh member provided in the communication channel, wherein the inside and outside of the exhaust pipe are in communication with each other via the mesh member.

* * * * *